United States Patent [19]

Stella et al.

[11] Patent Number: 4,561,742
[45] Date of Patent: Dec. 31, 1985

[54] DISK CAMERA USING SINGLE FORMAT FILM UNIT HAVING MULTIPLE IMAGES

[75] Inventors: Joseph A. Stella, Peabody; Joseph B. Wright, Marblehead, both of Mass.

[73] Assignee: Polaroid Corporation, Cambridge, Mass.

[21] Appl. No.: 646,762

[22] Filed: Sep. 4, 1984

[51] Int. Cl.[4] .............................................. G03B 17/52
[52] U.S. Cl. ...................................... 354/86; 354/121
[58] Field of Search ................................... 354/83–86, 354/120, 121, 123, 124

[56] References Cited

U.S. PATENT DOCUMENTS

| | | | |
|---|---|---|---|
| 2,496,630 | 2/1950 | Land | 95/13 |
| 2,638,828 | 5/1953 | Bachelder et al. | 95/89 |
| 3,255,670 | 6/1966 | Lasermann | 90/62 |
| 3,350,990 | 11/1967 | Finelli et al. | 95/13 |
| 3,369,469 | 2/1968 | Downey | 95/13 |
| 3,369,470 | 2/1968 | Downey | 95/13 |
| 3,421,423 | 2/1969 | Downey et al. | 95/13 |
| 3,437,023 | 4/1969 | Downey et al. | 95/13 |
| 3,437,024 | 4/1969 | Downey et al. | 95/13 |
| 3,446,131 | 5/1969 | Cook et al. | 95/13 |
| 3,455,222 | 7/1969 | Downey | 95/13 |
| 3,525,293 | 8/1970 | Harvey | 95/13 |
| 3,541,937 | 11/1970 | Nerwin | 95/13 |
| 3,541,938 | 11/1970 | Harvey | 95/13 |
| 3,541,939 | 11/1970 | Kamp | 95/30 |
| 3,541,940 | 11/1970 | Bartnick et al. | 95/30 |
| 3,575,081 | 4/1971 | Nerwin | 95/12 |
| 3,614,920 | 10/1971 | Kamp | 95/13 |
| 3,636,844 | 1/1972 | Kamp | 95/13 |
| 3,648,527 | 3/1972 | Kamp | 74/17.5 |
| 3,872,487 | 3/1975 | Gold | 354/86 |
| 4,068,244 | 1/1978 | Douglas | 354/85 |
| 4,114,166 | 9/1978 | Driscoll et al. | 354/76 |
| 4,132,471 | 1/1979 | Svatek et al. | 354/86 |
| 4,256,395 | 3/1981 | Johnson et al. | 354/180 |
| 4,265,525 | 5/1981 | Stella et al. | 354/76 |
| 4,382,668 | 5/1983 | Umehara et al. | 354/121 |

Primary Examiner—John Gonzales
Attorney, Agent, or Firm—Leslie J. Payne

[57] ABSTRACT

A pocket-size still camera of the self-developing type includes a film chamber with a rotatable platform supporting a self-developing film unit for rotation. A stepping motor is provided for rotating the platform and film unit in incremental steps to permit successive sections of the film unit to be exposed. An exit slot is provided in the film chamber to allow discharge of the exposed film unit through a pair of processing rollers. An embibing chamber is located adjacent the exit slot so as to receive the film unit for the appropriate embibition time.

5 Claims, 4 Drawing Figures

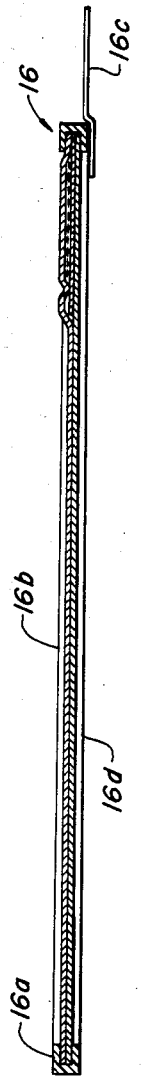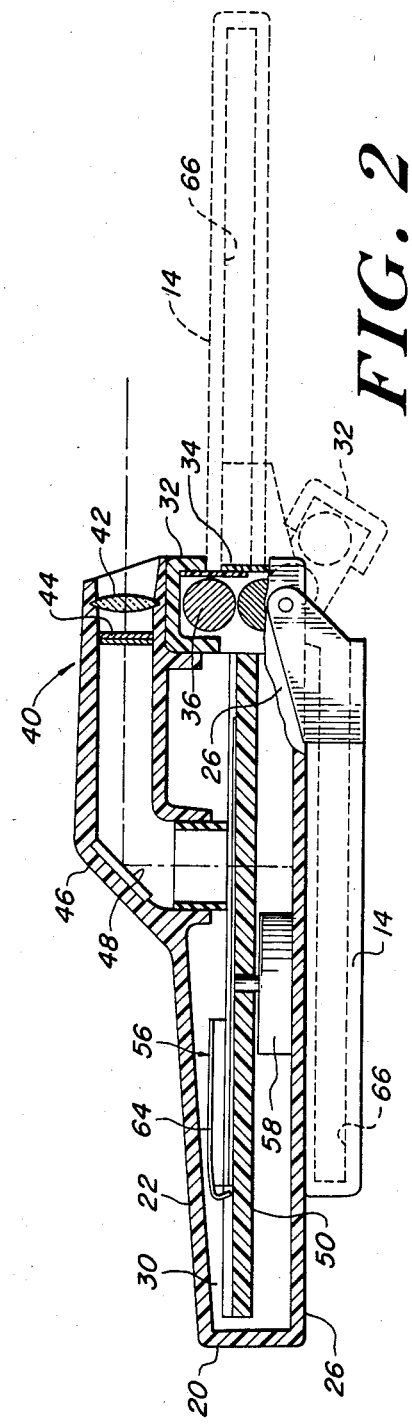

DISK CAMERA USING SINGLE FORMAT FILM UNIT HAVING MULTIPLE IMAGES

BACKGROUND OF THE INVENTION

This invention relates in general to photographic apparatus. More particularly, it is directed to a pocket-size still camera of the self-developing type, wherein a plurality of discrete images can be exposed in spaced relationship on a single film unit and then processed for subsequent viewing.

Self-developing cameras are extremely popular for a number of reasons including the fact that they have the facility of offering immediate feedback regarding the quality of a recently photographed scene. This, of course, enables a photographer to retake a scene to obtain a desired photograph.

It has been found that small or pocket-size photographic cameras are popular among travellers and other amateur photographers because such cameras free them from handling relatively bulky larger cameras.

Towards the end of addressing this situation, miniature self-developing cameras have been developed in which so-called instant slides are exposed and processed. Ordinarily, these positive image transparencies are premounted in a frame for facilitating their subsequent projection.

For representative examples of the prior art relating to miniature self-developing cameras reference may be made to the following U.S. Pat. Nos.: 2,854,903; 3,255,670; 3,350,990; 3,369,469; 3,369,470; 3,421,423,; 3,437,023,; 3,437,024; 3,446,127; 3,446,131; 3,455,222; 3,541,939; 3,541,940; 3,541,937; 3,541,938; 3,575,081; 3,525,293; 3,614,920; 3,648,527; 3,636,844; 4,114,166; 4,132,471; and 4,265,525.

To varying degrees the cameras described in the above-noted patents with the exception of the latter three require the photographer to manually handle a plurality of individual transparencies following processing in order to view them. Handling the many individual film units is, of course, clearly disadvantageous because there exists a possibility of damaging them. Moreover, their small size requires careful handling and storing because finger prints, dust and small particles of dirt are highly visible when the image on the slide is projected for viewing. Such handling and storing are disadvantageous from a cost and convenience standpoint.

In regard to U.S. Pat. No. 4,265,525 there is provided a camera, wherein a plurality of film transparencies are mounted on a disk for sequential exposure, processing and viewing. The camera, while achieving the foregoing, nevertheless requires a relatively complicated film cassette in which access and removal of the film units are relatively difficult.

SUMMARY OF THE INVENTION

It is an object of the present invention to overcome the drawbacks noted above. Towards this end there is provided an improved photographic apparatus.

This apparatus is comprised of a first camera housing section and movably coupled thereto a second camera housing section. Included in the first camera housing section is means for defining a film chamber; means for optically directing image forming scenelight to a focal plane in the film chamber, and means operable for unblocking and blocking scenelight to the focal plane so as to define an exposure interval. A single format film assembly of the instant developing type is provided upon which can be incident several discrete photographic images. For exposing successive sections of the film there is provided means for incrementing the mounting means. Such camera housing section includes means for effecting processing of all the images on the film assembly and an exit slot allowing discharge therefrom of the film assembly after passing the processing means.

The second or auxiliary housing section includes an imbibing chamber. When the second housing section is moved to the closed condition, the imbibing chamber is in operative communication with the exit slot so as to receive therefrom the film assembly. After an appropriate imbibition time, the second housing section is moved to its open condition, whereupon the film assembly can be removed from the chamber.

In a preferred embodiment, the mounting means includes a receptacle for removably receiving the film assembly and the incrementing means includes a stepper motor for stepping the mounting means. In this manner, successive discrete portions of the film assembly can be exposed at the focal plane.

Among the objects of the invention are the provision of a photographic apparatus in which a single format film assembly of the instant developing type is advanced so as to allow the exposure thereon of several discrete images; the provision of a photographic apparatus of the foregoing type which includes a secondary housing defining an imbibing chamber for allowing imbibing of the exposed film unit assembly; the provision of a stepper motor for incrementing movement of the film unit assembly during exposure of the several discrete images; the provision of a film assembly which provides for transparency.

Other objects and further scope of applicability of the present invention will become apparent from the detailed description to follow when taken in conjunction with the accompanying drawing wherein like parts are designated by like reference numerals.

BRIEF DESCRIPTION OF THE DRAWINGS

FIG. 2 is a cross-sectional view of the photographic apparatus of FIG. 1;

DETAILED DESCRIPTION

Figure 1:
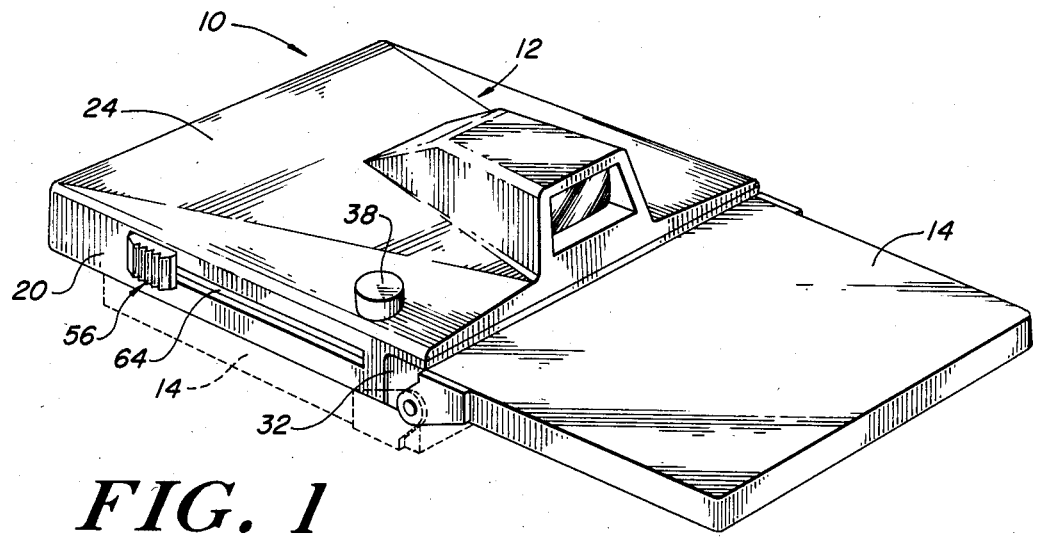
FIG. 1 is a perspective view of a photographic apparatus made in accordance with the present invention.
Figure 3:
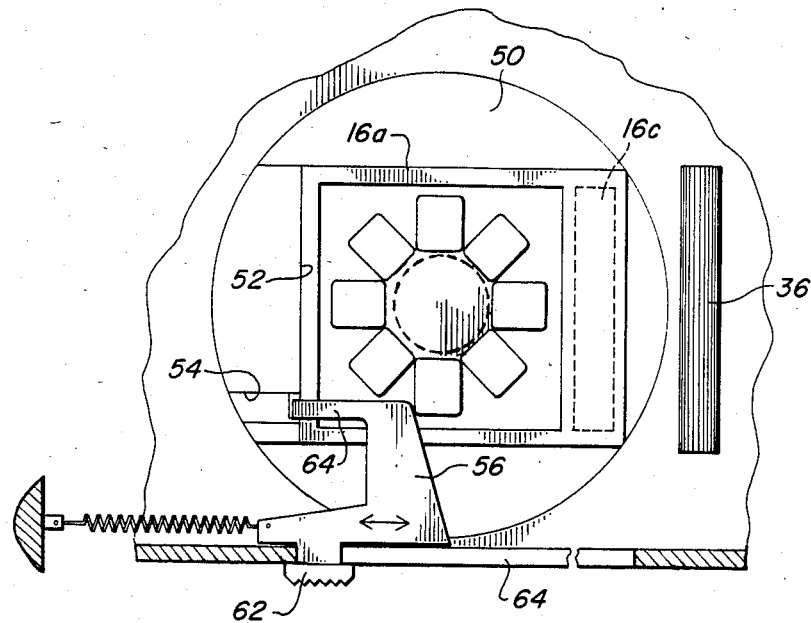
FIG. 3 is a fragmented view of the film advancing mechanism at the instant invention; and, FIG. 3A is a cross-sectional view of a transparency film unit.

Reference is now made to FIGS. 1-3 wherein there is depicted a photographic apparatus 10 made in accordance with the present invention. Essentially, the photographic apparatus 10 includes a main camera section 12 and pivotally attached thereto an auxiliary section 14. The latter is pivotally coupled to the former movement between an inoperative position (FIG. 2) and an operative position (FIG. 1) for purposes which will subsequently be made clear. The photographic apparatus 10 is arranged to cooperate with a single format film 16 of the instant slide transparency type, such as generally disclosed in commonly assigned U.S. Pat. No. 4,265,525.

In this invention, instead of a single photograph encompassing the entire image area of the film unit 16, there is contemplated formation of a plurality of small image areas 18. These relatively small images (e.g. 16 mm) can be conveniently recorded and handled for storage and projection purposes.

As best shown in FIG. 3 the film unit 16 includes a border or frame 16a to which is attached an image receiving or positive transparency sheet 16b. Located in an overlying relationship to the sheet 16b and associated with the frame is a rupturable pod 16c containing processing fluid. In overlying relationship to the positive sheet 16b and the pod 16c is a strippable negative sheet 16d. upon which the latent image of the scene is exposed onto and then transferred to the positive sheet 16b following processing.

Reference is again made to the main camera section 12. It includes a housing 20 having a parallelepiped shaped base section 24 which includes top, side and bottom walls 22, 24 and 26 respectively. Formed by the interior walls of the base section is a light-tight receiving chamber 30 for receipt therein of the film unit 16. Also, the housing 20 has interior walls which define an exposure chamber (not shown) within which is exposed a single small image area 18.

Prior to insertion in the camera, the film unit 16 is normally disposed within a standard camera back pouch, (not shown). The camera back pouch is easily tearable so that the film unit 16 can be inserted in the film receiving chamber 30. When the pouch is pulled, the film unit 16 remains in the chamber 30 while the pouch is withdrawn. The pouch protects the film from dust and ambient light.

For allowing access and removal of the film unit 16 to and from the film receiving chamber 30, there is provided a film loading door 32 pivotally mounted adjacent the open end of the film receiving chamber 30. The film loading door 34 is similar to film loading door described in commonly assigned U.S. Pat. No. 3,872,487. Such a door 32 includes a film exit slot 34 and a pair of film processing rollers 36 rotatably mounted therein. The nip of the rollers 36 is located in alignment with the path of the film unit 16 when the latter is being advanced. Moreover, the rollers 36 are in general alignment with the camera exit slot 34. As is known, the rollers 36 apply compressive forces to the film unit 16 in order to rupture the pod 16c and spread the fluid evenly over the plurality of image receiving areas 18. In this embodiment, the processing rollers 36 are not positively driven by a motorized drive system. Rather they are of the type shown and described in U.S. Pat. No. 3,872,487, wherein they rotate in response to the advancement of the film unit therebetween. It will, of course, be appreciated that the present invention contemplates that the rollers 36 can be suitably driven by a motorized drive system. Although not shown it will be understood that the film loading door 32 is releasably latched to the housing 20.

The top wall 24 is provided with a shutter button 38 which is operable upon actuation thereof to commence a photographic cycle. In this regard the shutter button is operatively associated with a shutter actuating means (not shown) by which a shutter blade arrangement may be operated to define an exposure cycle.

As more clearly illustrated in FIG. 2 the photographic apparatus 10 is provided with an optical system 40 through which light images of a scene to be photographed may be formed at a focal plane. Included in the optical system 40 is an objective lens 42 and a shutter blade arrangement 44 mounted in a wall formed by housing projection 46. A mirror 48 is also mounted in the housing projection 46 at a suitable angle so as to redirect image carrying rays from the lens 42 to a portion of the film unit located at the focal plane. It is to be further understood that the shutter blade arrangement 44 is operated to intersect the path of scene light from the objective lens 42 to the film focal plane.

Reference is now made to FIGS. 1 and 3 for better showing the film drive mechanism. In this embodiment, it includes an indexable film carrying tray 50. Formed in the film tray 50 is a film receiving recess 52 which is constructed to releaseably retain the film unit 16 therein. A film pick recess 54 is formed in the tray 52 so as to allow a rear film picking mechanism 56 to engage a rear edge of the film unit and drive the latter into engagement and through the rollers 36.

For indexing the tray 50 to a plurality of different exposure positions there is provided a tray drive mechanism indicated generally by reference numeral 58. In this embodiment, the tray drive mechanism 58 is defined by a stepper motor. The stepper motor can be of the type described in commonly assigned U.S. Pat. No. 4,435,614 and would be coupled to the tray 50 so as to incrementally drive the tray. Thus, successive unexposed image areas 18 would be positioned at the focal plane in the exposure chamber. The stepper motor is suitably driven by a stepper motor drive circuit (not shown) following termination of an exposure interval. In this regard the stepper motor drive circuit would be operated in coordination with the shutter blade control for effecting the proper exposure sequencing.

In this embodiment, the rear film picking mechanism 56 is of the type that is manually operated. As shown in FIGS. 1 and 3 there is a spring biased push tab 62 extending through a longitudinally extending slot 64 in the side wall of the housing 20. As viewed better in FIG. 3 the push tab 62 is connected to an integral finger 64. The finger 64 is constructed and arranged to engage the rear of the film unit 16 when the latter is in the orientation shown in FIG. 3. Whenever in this orientation, the pod 16c is at the so-called leading edge of the film unit 16. As such whenever a user pushes on the tab 62, the finger 64 engages against the rear edge of the film unit 16 and drives the latter through the processing rollers 36. Accordingly, the rollers 36, rupture the pod and spread the fluid uniformly across all the exposed image areas 18.

The film unit 16 is of the positive transparency type and requires a short imbibition period following spreading of the processing fluid. Towards this end, the imbibing chamber section 14 is pivoted to the housing 20. In its operative or extended position the imbibing chamber section 14 has the open-ended film unit imbibing chamber 66 in operative alignment with the exit slot 34. When the chamber 66 is in its operative relationship it forms a light-tight relationship with exit slot 34. Thus, the film unit 16 is advanced through the rollers 36, by a user pushing forwardly on tab, 62, and is eventually discharged into the open ended light-tight chamber 66. After the imbibition period, a user merely pivots the imbibing chamber section 14 to its retracted position solid line in FIG. 1. Accordingly, the imbibed film unit can be withdrawn through the open end of the chamber 66 and the negative sheet 16d stripped therefrom. What remains, of course, is the image recieving sheet 16b containing a plurality of scene images 18. Thus the integral positive sheet can conveniently store several small images in a manner which not only enhances their handling capacity, but which also minimize damage thereto.

From the foregoing, it is believed the operation of the photographic apparatus is easily understood. Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. Photographic apparatus comprising:

a first camera housing section;

a second housing section coupled to said first housing section for movement between open and closed conditions;

said first camera housing section including means defining a film chamber; means for optically directing image forming scene light to a focal plane in said film chamber, means being operable for unblocking and blocking scene light travelling to the focal plane so as to define an exposure interval at the focal plane, means for mounting for movement in said compartment a single format film assembly of the instant developing type upon which several spaced images can be exposed for movement in said compartment; means for incrementing said mounting means relative to the focal plane so that successive sections on the single film assembly are exposed; means for effecting processing of all the images on said film assembly, and said housing having an exit slot allowing discharge of the film assembly passes said rollers;

said second housing section including an imbibing chamber, said second housing section when moved to the closed condition has said imbibing chamber in operative communication with said exit slot for receiving therein the discharged film assembly, and when moved to the open condition has said imbibing chamber accessible so that the film assembly can be removed therefrom.

2. The apparatus of claim 1 wherein said means for mounting the film assembly includes a carrier rotatable in said compartment and a film assembly receiving receptacle formed therein which slidably and removably receives the film assembly.

3. The apparatus of claim 2 wherein said incrementing means includes a stepper motor arrangement for stepping said carrier.

4. The apparatus of claim 3 wherein said means for effecting processing includes a pair of pressure applying members for effecting rupture of a pod of processing fluid in the film assembly and spreading of the fluid across the several exposed image receiving areas.

5. The apparatus of claim 4 wherein said means for effecting processing includes a manually actuable film picking mechanism which is responsive to manual actuation to advancing the film unit from said film receiving receptacle to said pressure applying members.

* * * * *

UNITED STATES PATENT AND TRADEMARK OFFICE
CERTIFICATE OF CORRECTION

PATENT NO. : 4,561,742

DATED : December 31, 1985

INVENTOR(S) : Joseph A. Stella

It is certified that error appears in the above-identified patent and that said Letters Patent is hereby corrected as shown below:

On the title page, Item [75] Inventors:

"Joseph B. Wright" should read -- Joseph H. Wright --.

Signed and Sealed this

Twenty-second Day of April 1986

[SEAL]

Attest:

DONALD J. QUIGG

Attesting Officer

Commissioner of Patents and Trademarks